United States Patent [19]

O'Donoghue

[11] 4,013,278
[45] Mar. 22, 1977

[54] PORTABLE THERMAL METAL REFINING APPARATUS

[76] Inventor: Philip J. O'Donoghue, 6 E. 45th St., Minneapolis, Minn. 55409

[22] Filed: Jan. 30, 1975

[21] Appl. No.: 545,295

[52] U.S. Cl. ............................................. 266/213
[51] Int. Cl.² ......................................... F27B 7/00
[58] Field of Search ................. 75/43, 44 R, 44 S; 266/33 S, 33 R, 36 H, 200, 213, 244, 901; 432/65, 103, 105

[56] References Cited

UNITED STATES PATENTS

| | | | |
|---|---|---|---|
| 1,334,459 | 3/1920 | Jones | 266/33 R |
| 1,524,397 | 1/1925 | Jones | 432/105 |
| 1,836,139 | 12/1931 | Trumble | 266/33 R |
| 2,144,230 | 1/1939 | Russell | 75/43 |
| 2,184,297 | 12/1939 | Grindle | 266/33 R |
| 3,235,242 | 2/1966 | Fukuda | 266/36 H |
| 3,385,585 | 5/1968 | Kawawa | 75/43 |
| 3,567,201 | 3/1971 | Beckett | 266/33 |

*Primary Examiner*—Roy Lake
*Assistant Examiner*—Paul A. Bell
*Attorney, Agent, or Firm*—Merchant, Gould, Smith, Edell, Welter & Schmidt

[57] ABSTRACT

A portable highly versatile thermal metal refining apparatus for selectively reclaiming metals from a mixed or combined load of materials having varied melting temperatures. A refining chamber cylindrically shaped about a central axis having oppositely disposed open and closed ends defines an internal reduction cavity loaded through its open end. The chamber cavity is lined with durable glass, enabling successive reduction cycles of different metals without carry-over contamination. Detachable support and drive means mount the refining chamber for operative rotation about the central axis, and pivotal means are provided for controlling the operative pitch of the central axis. Field supply means, operable from available field sources, provide a controlled fuel/air mixture to a burner nozzle at the closed end of the chamber for directing a reducing flame toward a load within the reduction cavity. A freestanding reflector panel minimizes heat loses from the open end of the chamber while maintaining loading access therethrough.

9 Claims, 1 Drawing Figure

PORTABLE THERMAL METAL REFINING APPARATUS

BACKGROUND OF THE INVENTION

1. Field of the Invention:

This invention relates generally to metal refining apparatus and more particularly to a versatile portable thermal metal refining apparatus for selectively reclaiming metals from a combination or mixture of a plurality of materials having varied melting temperatures.

2. Description of the Prior Art:

Metal refining furnaces have long been known in the prior art. The prior art metal refining furnaces may generally be classified according to the use to which they are put. A first class of metal refining apparatus, suitable for continuous refining operation over extended periods of time at a single location, is generally characterized by a large non-portable refining chamber of varied configurations, but substantially closed to retain heat conducted into the reduction chamber for continuoulsy reducing a load introduced therein. The reducing heat is typically generated remote from the reduction chamber proper by means of a hearth or the like and is directed or forced into or around the reduction chamber. Such refining apparatus is generally suitable for use in foundries for the refining of ores into readily mouldable metals. Besides being non-portable, refining apparatus falling within this first classification is typically not suitable for reclaiming different metals in successive, closely spaced reducing cycles. This results from the construction of the reduction chamber, which generally has an inner surface that is highly susceptible to contamination by the last reduced metal, which would carry over undesired impurities into the reclamation cycle of a different metal on a successive reduction cycle.

The recent emphasis on resource conservation has led to increased demand for salvaging and reclaiming metals from combinations or mixtures of a plurality of scrap metals or the like for subsequent reprocessing. This has given rise to a second classification of refining apparatus, generally characterized by its ease of portability amoung a plurality of reclamation sites. Refining apparatus within this classification should ideally display the characteristics of: ease of portability, simplicity of use; reliable maintenance free operation; the capability of being completely operable from any one of a plurality of fuel sources available at the reduction site for producing the required reducing temperature; the capability of reclaiming different metals in successive reducing cycles without contamination from previous reduction cycles; ease of access to the reduction chamber proper for introducing loads of varied sizes and configurations; the flexibility of repetitively or continuously loading the reducing chamber without interruption to the reduction process; minimization of heat lose from the reduction chamber while permitting undesired impurities to be directly burned off by the reducing flame; ease of removal of molten metal and residue from the reduction chamber; and a plurality of reduction modes including rotating vs. nonrotating reduction chamber and retained puddling vs. continuous outflow reducing techniques for enabling the reclamation of a plurality of metals having a wide spectrum of melting temperatures and preferred reduction techniques.

Portable metal refining apparatus within this second classification has been designed which satisfy several of the above criteria; but none of such prior art portable refining apparatus simultaneously satisfies each of the desired operative characteristics for such apparatus. One such portable metal refining device of the prior art employs a pivotally mounted non-rotating refining crucible having an open end for loading access to the reduction crucible and means for directing a reducing flame toward the closed end of the crucible. This apparatus while providing several of the desired characteristics, provides only one reduction mode (i.e. reduction in a puddling mode, with the crucible, having its open end tilted upwardly to retain its load and reduced molten metal toward the closed end) and requires a cumbersome block and tackle apparatus for lowering the open end of the crucible following a reduction cycle for pouring the reduced molten metal therefrom. Further, this apparatus does not provide for operative rotation of the reduction chamber or for continuous reducing operation in a non-puddling mode wherein the metal as reduced continuously flows out of the reduction chamber, permits significant heat lose from the reduction chamber during the reducing process and is not suitable for reclaiming different metals in successive reduction cycles without introducing impurities from earlier reduction cycles into the reclaimed metals of later reduction cycles.

The portable thermal metal refining apparatus of this invention overcomes these prior art disadvantages by providing a simple, efficient, rugged, flexible and relatively maintenance free apparatus which satisfies each of the above listed desired attributes for such a device. The portable refining appratus of this invention is readily portable, is suitable for complete operative use with any one of a plurality of available fuel supplies and for selectively reclaiming a plurality of different metals having a broad spectrum of melting temperatures and offers the capability of reclaiming different metals in successive reducing cycles without carry-over of contaminants from a prior cycle into a successive reduction cycle.

While particular materials will be described in connection with the construction of a preferred embodiment of this invention, it will be understood that the invention is not limited to the use of these materials. Further, while particular support and motion imparting drive apparatus will be disclosed in connection with a preferred embodiment of this invention, it will be understood that other support and drive configurations could equally well be employed within the spirit and intent of this invention. Other variations will be pointed out within the following detailed description of a preferred embodiment of this invention following and will be understood to fall within the spirit and intent of this invention.

SUMMARY OF THE INVENTION

The present invention provides an improved portable and versatile thermal metal refining apparatus for selectively reclaiming metals from a load containing a combination or mixture of a plurality of materials having varied melting temperatures. The refining apparatus encompassed by this invention includes a cylindrical refining chamber having a closed end defining an internal reduction cavity with the internal cylindrical walls of the refining chamber, and an oppositely disposed open end providing unobstructed loading access to the internal reduction cavity. The internal reduction cavity is lined with a continuous glass layer for extending the operative lifetime of the reduction chamber while providing a non-contaminatable inner lining for the reduction cavity, enabling different metals to be reclaimed on successive reducing cycles without suffering contamination from prior reduction cycles.

Suitable support means rotatably mounts the cylindrical refining chamber for rotation about a central axis longitudinally extending through the refining chamber, and drive means are operatively connected for imparting rotational movement to the refining chamber about its central axis. The refining chamber can be tilted by pivotal control means such that either its closed or open end can be positioned relatively lower the respective opposite end of the refining chamber during an operative reduction cycle. The refining apparatus is thus operable either in a puddling reduction mode wherein the refining chamber is tilted such that its closed end is lower relative its open end to retain (puddle) reduced molten metal within the closed end of the reduction cavity, or in a non-puddling reduction mode wherein the open end of the refining chamber is positioned lower relative its closed end to cause reduced molten metal to continuously flow out of the open end during the operative reduction process.

A reducing flame is directed toward a load placed within the reduction cavity of the refining chamber from a burner nozzle projecting through the closed end of the refining chamber. Fuel suppy means, operable to accommodate any one of a plurality of fuels convenient at the reduction site, supplies a pressurized selected mixture of fuel and air to the burner nozzle for providing a reducing flame of predetermined heat intensity.

The reducing flame directed the load, in combination with the rotational motion of the refining chamber enables rapid and efficient reduction process control and direct burnoff of undesirable contaminants such as paint or the like present within the load. A detached reflector panel operatively positioned in confronting spaced apart alignment with the open end of the refining chamber. The reflector panel reflects heat back into the internal reduction cavity, minimizing heat loss and fuel consumption during a reduction cycle while stabilizing the temperature within the internal reduction cavity and enabling continuous operative loading access to the internal reduction cavity through the open end of the refining chamber during an operative reduction cycle.

The refining chamber, support means, fuel supply means and reflector panel are easily segmented to provide rapid portability of the refining apparatus.

BRIEF DESCRIPTION OF THE DRAWING

Referring to the Drawing, wherein like numerals represent like parts throughout the several views.

DESCRIPTION OF THE PREFERRED EMBODIMENT

Figure 1:
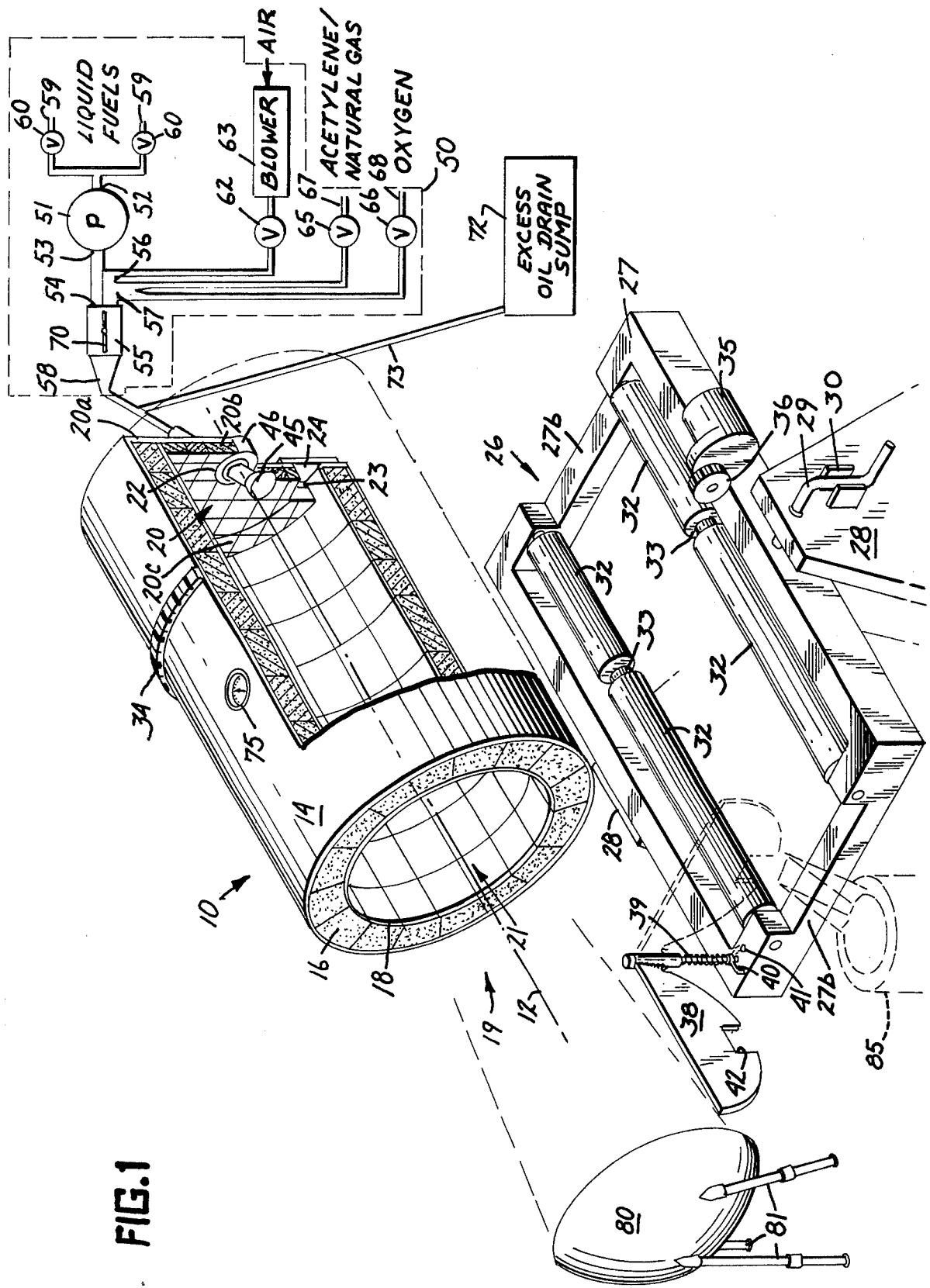
FIG. 1 is an exploded view in perspective with portions thereof broken away, of a preferred embodiment of this invention, with the fuel supply means portion thereof represented in functional block diagram form.

Referring to the Drawing a preferred embodiment of a portable thermal metal refining apparatus constructed according to the principles of this invention is diagrammatically illustrated in exploded perspective view in FIG. 1. A refining chamber, generally designated at 10, is of cyclindrical shape, symmetrically disposed about a central axis 12 longitudinally extending therethrough. The refining chamber 10 is generally characterized by a rigid cylindrical outer casing 14, constructed in the preferred embodiment, of high carbon content steel, however, other materials could equally well be employed. The inner surface of the casing 14 is lined with an insulating layer 16 such as high temperature firebrick, longitudinally extending the entire length of the refining chamber 10. In the preferred embodiment, the refining chamber 10 is typically 4 to 5 feet long, rendering ease of portability thereof; however, it is clear that other dimensions are equally well included within the spirit and intent of this invention. The innermost surface of the firebrick insulation layer is coated with a layer of glass 18 which is flowed thereon to seal the spacing between the firebrick and to fill irregularities thereof, providing a smooth and durable interior lining to the refining chamber. While materials other than glass could be used within the confines of this invention for lining the refining chamber 10, glass is particularly desirable for its high melting temperature, for its hardness and durability when annealed, and for its non-porosity which prevents contaminants from penetrating or adhereing to the glass layer during or after a high temperature reduction process. The importance of this feature will become apparent upon a more detailed description of the invention.

The refining chamber 10 has an open end generally disignated at 19, and a closed end oppositely disposed therefrom, sealed by means of an end plate 20 mounted for rotation with the refining chamber 10. The end plate 20 in cooperation with the internal glass surface layer 18 of the refining chamber 10, defines an internal reduction cavity, generally designated at 21. The end plate 20 can be constructed of any suitable material capable of withstanding high reduction temperatures. In the preferred embodiment, the end plate 20 comprises an external steel plate (20a), lined with an insulation layer of firebrick (20b) and having circumferential ring of glass coating (20c) forming a continuous surface with the glass layer 18 of the cylindrical refining chamber 10. The end plate 20 has an opening 22 therethrough axially aligned with the longitudinal central axis 12, and a discharge port 23 extending therethrough and adjacent the internal surface 18 of the refining chamber 10. The discharge port 23 has a slidable door 24 operatively associated therewith and latching means (not illustrated) for locking the door 24 in either an open or closed position.

The refining chamber 10 is rotatably mountable upon a support structure, generally designated at 26, comprising a generally rectangular support frame 27 pivotally mounted to a pair of support legs 28 near the longitudinal center position of the support frame 27. A crank and associated gear apparatus, generally designated at 29, operatively connects the rectangular support frame 27 to the support legs 28 for pivotally controlling the inclination of the support frame relative the horizontal. A locking apparatus 30 secures and maintains the pivotal control apparatus 29 in a locked position when the desired inclination (pitch) of the support frame 27 has been obtained.

A plurality of support rollers 32 are logitudinally mounted to the ends of the support frame 27 and project above the upper surface of the support frame 27 for rotatably supportingly engaging the cylindrical outer casing 14 of the refining chamber 10. When in resting engagment upon the support rollers 32, the refining chamber 10 lies between and slidably engages the oppositely disposed support frame cross members (27b) to prevent longitudinal movement of the refining chamber 10 relevant the support frame 27, regardless of the pitch of the support frame 27 as defined by the pivotal control apparatus 29.

An externally toothed ring gear 34 is secured to the cylindrical outer casing 14 of the refining chamber 10, forming a gear surface around the entire circumference of the refining chamber 10. The support rollers 32 on either side of the frame 27 are spaced at 33 to enable free movement of the ring gear 34 therebetween during rotation of the refining chamber 10. A drive motor 35 is mounted to the support frame 27. The output shaft of the drive motor 35 terminates at a pinion gear 36 configured for cooperative mating engagement with the ring gear 34 and is aligned therewith to impart rotational motion to the refining chamber 10 about its central axis 12, as enabled by the plurality of support rollers 32. The drive motor 34 may be of the variable speed type having a speed control apparatus, (not illustrated) associated therewith, for varying the rotational speed of the refining chamber 10.

A gate member 38 is pivotally mounted about a spring loaded vertical shaft member 39 to one end of the support frame 27. The shaft support 39 has a locking latch projection 40 insertable within a plurality of spaced holes 41 the support frame 27 for positioning the gate member 39 between first and second locked positions. The gate member 38 is illustrated in FIG. 1 as it would appear in its open or second position. The gate member 38 is movable to a first position, wherein the general plane of the gate member is oriented perpendicular to the central axis 12, by manually unlocking the latch projection 40 from its associated second position hole 41 against the bias of the spring loaded vertical shaft 39 and by subsequently manually positioning the gate member 38 to its first position, illustrated in dashed lines in FIG. 1. The gate member 38 is sized and configured to slidably engage when in its closed first position the refining chamber 10 at its open end 19, so as to prevent a load within the internal reduction cavity 21 from sliding out of the open end of the refining chamber 10. The gate member 38 is sized to only partially close the circular open end 19 of the refining chamber 10, the importance of which will become clear upon a more detailed description of the invention. The gate member 38 has an opening 42 formed therethrough which is positioned for alignment with the glass lining 18 of the refining chamber 10 to enable free flow of reduced molten metal from the internal reduction cavity 21 during a reduction cycle.

A burner nozzle 45 is fixedly mounted (not illustrated) external of the refining chamber 10 and projects through the axially aligned opening 22 therein, into the internal reduction cavity 21 at an oblique angle with the central axis for directing a reducing flame toward a load resting upon the lower glass lined portion of the refining chamber 10. A bearing 46 mounted within the end plate 20 cooperatively engages the burner nozzle 45, prohibiting catching of the end plate 20 during rotation upon the non-rotating burner nozzle 45, while providing a thermal barrier around the burner nozzle 45. The burner nozzle 45 may have an appropriate ignition means (not illustrated) operatively associated therewith within the internal reduction cavity 21 for igniting fuel vapor emitted by the burner nozzle 45 at the initiation of a reduction cycle. Alternatively, the reduction flame can be manually ignited at the beginning of a reduction cycle.

A fuel supply means, schematically illustrated at 50 operatively supplies a predetermined mixture of fuel and air/oxygen from selected ones of a plurality of available fuel and air sources. In the preferred embodiment, the fuel supply means 50 has a liquid fuel pump 51 having an inlet port 52 and an outlet port 53, directly connected to provide liquid fuel to a first inlet port 54 of a mixing chamber 55. The pump 51, is in the preferred embodiment, a high pressure pump suitable for receiving liquid fuels under gravity feed at its inlet port 52 and for providing pressurized fuel flow at its output port 53. It will be understood that control means (not illustrated) can be operatively connected with the pump 51 to vary the output pressure from the pump 51. The inlet port 52 of the liquid pump 51 is connected to receive liquid fuels from a plurality of liquid fuel source lines 59, each having a shup-off control valve 60. In the preferred embodiment, the liquid fuel lines 59 may be connected to such fuel sources as NO 2 fuel oil, to recycled crankcase oil, or the like. The mixing chamber 55 further has a second inlet port 56, a third inlet port 57 and an output port 58 which is directly connected to supply a vaporized fuel and air mixture to the burner nozzle 45.

The second inlet port 56 of the mixing chamber 55 is connected by means of a valve 62 and a suitable blower 63 for providing a regulated pressurized flow of air to the mixing chamber 55. The third inlet port 57 of the mixing chamber 55 is connected by means of a pair of valves 65 and 66 respectively to sources of acetylene or natural gas 67 and oxygen 68 respectivley. The valves 65 and 66 can be appropriately regulated to provide the desired mixture of acetylene or natural gas and oxygen to the third inlet port 57 of the mixing chamber 55.

The mixing chamber 55 includes a butterfly valve 70 cooperatively disposed relative the first, second and third inlet ports 54, 56 and 57 respectively of the mixing chamber 55, and having appropriate external regulatory control means (not illustrated) associated therewith, to control the butterfly valve for providing the desired air/fuel vapor mixture to the outlet port 58 of the mixing chamber 55. This air/fuel mixture supplies the burner nozzle 45. The details of construction of a butterfly valve are well known in the art and are not detailed herein. It will be understood that while a specific configuration and mixing chamber apparatus has been illustrated for the fuel supply means 50, other configurations which provide the flexibility of supplying the burner nozzle 45 from any one of a plurality of fuels either available at the particular reduction site or required for proper reduction of the particular metal being reduced, could equally well be employed within the spirit and intent of this invention.

An excess oil drain sump, generally designated at 72 is operatively connected by means of a drain line 73 to the lower portion of the burner nozzle 45 located external of the refining chamber 10, to collect any excess (non-vaporized) fuel build-up within the burner nozzle 45, to prevent the sputtering of this excess fuel into the internal reduction cavity 21, thus insuring a clean reducing flame from the burner nozzle 45.

A temperature gage 75 is mounted upon the refining chamber 10 having a temperature sensor (not illustrated) extending within the internal reduction cavity 21 for sensing the reducing temperature developed therein. In the preferred embodiment, the temperature gage 75 is calibrated to record temperatures of up to 3000 degrees Fahrenheit.

A free-standing reflector member 80 is mounted upon a plurality of supporting legs 81 and is cooperatively sized for alignment adjacent to but in spaced relationship with the open end 19 of the refining chamber 10 to reflect heat emanating therefrom back into the internal reduction cavity 21. The support legs 81 are extendable to enable adjustable alignment of the reflector member 80 with the refining chamber 10, to compensate for the pivotal attitude of the refining chamber 10. In the preferred embodiment, the reflector member 80 has a highly reflective parabolic curved surface directed toward the refining chamber 10 for directing the reflected heat back toward a load within the internal reduction cavity 21 and for minimizing heat loses therefrom. The curved reflector 80 of the preferred embodiment is designed to be positioned several feet spaced from the open end 19 of the refining chamber 10 to permit spent exhaust fumes and burned-off impurities to leave the internal reduction cavity 21 while permitting continuous loading of scrap materials (the load) into the internal reduction cavity 21 through the open end 19 without disruption to the reduction cycle and with minimum interference with the reflection of heat back into the internal reducton cavity 21 by means of the reflector member 80.

OPERATION OF THE PREFERRED INVENTION

The metal refining apparatus of this invention comprises a plurality of independent, segmentable cooperating portions particularly suited for ease of portability from site to site. Further, this invention provides a highly efficient and flexible thermal metal refining apparatus suitable for reclaiming a plurality of different metals, requiring varied reduction techniques, and permits successive reclamation of different metals without carry-over contamination from prior reduction cycles.

A load of scrap metal or the like is introduced into the internal reduction cavity 21 of the refining chamber 10 through its open end 19. The fuel supply means 50 is adjusted to provide a fuel/air mixture to the burner nozzle 45 such that when ignited, directs an accurately regulated reducing flame of predetermined heat intensity at the load within the reduction cavity 21. The use of a direct flame impinging upon the load has the advantage in many circumstances of directly burning off undesirable contaminants such as paint or the like. The open end 19 of the refining chamber 10 permits the exit of spent exhaust fumes and the undesirable contaminants as directed by the air-current force from the burner nozzle toward the open end 19, while the reflector member 80 maintains a uniform reduction heat within the internal reduction cavity 21. The spaced apart alignment of the reflector member 80 relative the open end 19 of the refining chamber 10 enables continuous loading of the refining chamber 10 during a reduction cycle.

The unique support, rotational drive, and pivotal control means of this invention, in combination, provide a high degree of use flexibility as to the nature of the reduction cycle process which is to be employed for any particular metal. Certain metals such as lead reduce better under conditions wherein a puddle of reduced molten material is retained within the reduction chamber during the reduction cycle. The apparatus of this invention is operable to puddle the molten material toward the closed end 20 of the refining chamber 10 by adjusting the pivotal control apparatus 29 to tilt the support frame 27 so as to position the closed end 20 of the refining chamber 10 lower relative its open end 19. When operative in this "puddling mode" the refining chamber 10 may or may not be rotated by means of the drive motor 35, as desired, and the reduced molten metal may be periodically removed from the closed end 20 of the internal reduction cavity 21 when desired by opening the door 24 at the discharge port 23. This technique of periodic removal of the molten material from the internal reduction cavity 21 will not interfere with the continuous reduction process. Alternatively, the reduced molten material can be periodically removed by tilting the refining chamber 10, by means of the pivotal control apparatus 29, so as to pour the reduced molten material out from the internal reduction cavity 21 through its open end 19.

Certain metals can be continuously reduced without the need of maintaining a puddle thereof within the internal reduction cavity 21. For these metals, the refining chamber 10 can be inclined by means of the pivotal control apparatus 29 so as to position the open end 19 of the refining chamber 10 lower relative its closed end 20. In this "non-puddling" mode of operation, the gate member 38 can be poisitioned in its first position to slidably engage the refining chamber 10 and for retaining large load particles within the internal reduction cavity 21 while permitting continuous flow of reduced molten metal out of the internal reduction cavity through the hole 32 in the gate 38. The molten material thus leaving the open end 19 of the refining chamber 10 can be collected in a suitable ingot, illustrated in dashed lines at 85 in FIG. 1. The low-relief gate member 38 provides ready access to the internal reduction cavity 21 through the open end 19 of the refining chamber 10 for loading purposes. Further, the spaced apart operational relationship of the reflector member 80 relative the open end 19 of the refining chamber 10, enables free outward swinging movement of the gate 38 and unimpaired loading of the refining chamber 10 while maintaining the reduction heat within the internal reduction cavity 21.

The internal glass lining 18 of the refining chamber 10 provides a durable surface for the underlying soft and porous firebrick insulation layer, enabling extended wear for a lifetime of the refining chamber 10, particularly when used in a rotational mode with bulky sharp configured loads which would otherwise abuse and gouge the softer internal lining of the refining chamber 10. The glass lining 18 also enables successive refining cycles for different metals to be efficiently performed, without carry-over contamination from prior cycles. Therefore, successive reducing cycles can be performed upon a single load containing a plurality of metals which are to be reclaimed without removing the load from the internal reduction chamber, simply by staging the reduction temperature provided by the burner nozzle 45 and fuel supply means 50 through predetermined temperature plateaus. Since the reduced metals do not absorb into or adhere to the glass lining 18 during a reduction cycle, there are no impurities from a prior reduction cycle remaining within the internal reduction cavity 21 to contaminate a different reclaimed metal from a successive reduction cycle.

The metal refining apparatus of the invention is particularly suitable for reclaiming metals having melting temperatures of up to 3000 degrees Fahrenheit; however, the spirit and intent of this invention clearly encompass higher melting temperatures. Metals such as aluminum, lead, zinc, copper, gold, silver, stainless steel, low phosphorous iron, babbit bearing metals, platinum and cadmium and the like, can all be successfully and efficiently reduced by means of this invention.

Other modifications of the invention will be apparent to those skilled in the art in light of the foregoing description. The description is intended to provide a concrete example of a preferred embodiment which clearly discloses the present invention. Accordingly, the invention is not limited to any particular embodiment. All alternative modifications and variations of the present invention which fall within the spirit and broad scope of the appended claims are covered.

I claim:

1. Portable refining apparatus for sequentially smelting thermally differentiated metals comprising:
    a. a refining cylinder rotatable about a central axis longitudinally extending therethrough, said cylinder having an end plate sealingly closing one end thereof and defining with the internal walls of said cylinder an internal reduction chamber, and an oppositely disposed open end defining an access port having a diameter substantially equal to the internal diameter of said reduction chamber providing unobstructed access to said internal reduction chamber said refining chamber having a generally smooth, non-porous glass layer defining the inner cylindrical walls of said reduction chamber;
    b. support means for rotatably supporting said refining cylinder for rotation about said central axis;
    c. drive means operatively connected to said refining cylinder for controllingly rotating said cylinder about said central axis;
    d. pivotal control means operatively connected to said support means for controlling the pitch of said central axis relative to the horizontal, said pivotal control means normally operable to tilt said refining cylinder for inclining said central axis so as to position said open end of the cylinder higher relative to its said closed end;
    e. burner nozzle means fixedly mounted external of said refining cylinder and operatively projecting through said end plate for directing a reducing flame obliquely toward the lower portion of said internal reduction chamber;
    f. fuel supply means operatively connected with said burner nozzle means for controllingly supplying a pressurized mixture of selected fuels and air to said burner nozzle means; and
    g. a free-standing reflector member operatively positionable in confronting spaced apart alignment with the open end of said refining cylinder, said reflector member having a reflective surface of parabolic shape and sized to cooperatively align with the completely open end of said refining cylinder, for reflecting heat back into said internal reduction chamber while allowing reduced molten metal to flow out of said open end, and enabling loading of said chamber through said open end thereof without requiring movement of said reflector member.

2. Portable refining apparatus according to claim 1, including a gate member mounted to said support means for pivotal swinging movement about a generally vertical axis adjacent the open end of said refining cylinder and configured to slidably engage said reduction cylinder along the lower portion of its open end for partially closing said open end.

3. Portable refining apparatus according to claim 2, wherein said end plate of said refining cylinder includes a closable discharge port therethrough for selectively enabling access to and discharge from said internal reduction chamber at a position adjacent the internal cylindrical wall thereof.

4. Portable refining apparatus according to claim 1, wherein said refining cylinder comprises:
    a. an external rigid cylindrical casing suitable for maintaining its shape when subjected to high temperatures;
    b. an insulating layer of firebrick continuously circumferentially disposed within said external casing along its entire length; and
    c. said hard non-porous glass layer comprising a thin glass coating layer covering the inwardly directed cyclindrical surface of said firebrick, to prevent contamination of said underlying firebrick.

5. Portable refining apparatus according to claim 1, wherein said fuel supply means comprises means for selectively applying a plurality of different fuels to said burner nozzle means for supplying variable air pressure to said burner nozzle means; and wherein said burner nozzle means includes a butterfly mixing valve for controllingly varying the proportions of air to fuel mixtures supplied to said internal reduction chamber.

6. Portable refining apparatus according to claim 1, wherein said support means includes a plurality of roller bearings mounted to supportingly engage the external lower surface of said reduction cylinder and means slidably engaging the reduction cylinder for preventing longitudinal movement of said cylinder relative to said support means; and wherein said drive means comprises a ring gear circumferentially disposed about and affixed to the external surface of said refining cylinder and pinion gear drive means fixedly mounted to matably engage said ring gear for imparting rotary motion to said refining cylinder about said central axis.

7. A portable thermal metal refining apparatus for selectively reclaiming metals from a combination or mixture load of a plurality of materials having varied melting temperatures, comprising:
    a. a refining chamber characterized by:
        i. a rigid cylindrical outer casing symmetrically disposed for rotation about a central axis longitudinally extending therethrough;
        ii. a firebrick refractory insulation layer lining the entire inner surface of said outer casing and mounted for rotation therewith;
        iii. a thin cylindrical smooth, non-porous glass layer lining the inner surface of said firebrick;
        iv. end plate means for sealingly closing one end of said refining chamber, said end plate means defining with said glass lining layer a cylindrical internal reduction cavity, said end plate means having an opening therethrough axially aligned with said central axis; and
        v. that end of said refining chamber oppositely disposed from said end plate means remaining completely open, to substantially the same diameter of that of said reduction cavity for enabling unencumbered introduction of a load therethrough to said internal reduction cavity;
b. support means for rotatably supporting said refining chamber for rotation about said central axis;
c. drive means operatively connected to said refining chamber for controllingly rotating said chamber about said central axis;
d. means for pivotally controlling the longitudinal inclination of said refining chamber, selectively enabling either said open or said closed end of said refining chamber to be positioned relatively lower than said respective opposite end thereof without interferring with the rotational motion of said refining chamber about said central axis;
e. burner nozzle means fixedly mounted external of said refining chamber and operatively projecting through said opening in said end plate means for directing a reducing flame obliquely toward said load resting upon the lower portion of said internal reduction cavity;
f. fuel supply means operatively connected with said burner nozzle means for controllingly supplying a pressurized mixture of selected fuels and air to said burner nozzle means; and
g. free-standing reflector means operatively positioned in confronting spaced apart alignment with said open end of said refining chamber for reflecting heat back into said internal reduction cavity.

8. A portable thermal metal refining apparatus according to claim 7, wherein said reflector means comprises a free-standing reflector member having a concave reflector surface addressing said open end of said refining chamber and sized to cooperatively align with substantially the entire inner diameter of said open end.

9. A portable thermal metal refining apparatus according to claim 7, including non-rotatable gate means operatively connected for sliding engagement with said open end of said refining chamber for retaining said load within said internal reduction cavity of said chamber during rotation thereof while enabling free flow of molten metal reduced from said load out of said open end of said chamber.

* * * * *